United States Patent [19]

Church

[11] Patent Number: 4,829,580
[45] Date of Patent: May 9, 1989

[54] TEXT ANALYSIS SYSTEM WITH LETTER SEQUENCE RECOGNITION AND SPEECH STRESS ASSIGNMENT ARRANGEMENT

[75] Inventor: Kenneth W. Church, Berkeley Heights, N.J.

[73] Assignee: Telephone and Telegraph Company, AT&T Bell Laboratories, Murray Hill, N.J.

[21] Appl. No.: 844,077

[22] Filed: Mar. 26, 1986

[51] Int. Cl.[4] .......................... G06F 7/00; G10L 3/00
[52] U.S. Cl. ...................................... 381/52; 364/419; 364/900
[58] Field of Search ... 364/200 MS File, 900 MS File, 364/300, 513.5, 419; 381/41, 43, 52

[56] References Cited

U.S. PATENT DOCUMENTS

| | | | |
|---|---|---|---|
| 4,414,629 | 11/1983 | Waite | 364/300 |
| 4,443,856 | 4/1984 | Hasimoto et al. | 364/513.5 |
| 4,455,615 | 6/1984 | Tanimoto et al. | 364/513.5 |

OTHER PUBLICATIONS

IEEE Transactions on Acoustics, Speech, and Signal Processing, vol. ASSP-24, No. 6, Dec. 1976, "Letter-to-Sound Rules for Automatic Translation of English Text to Phonetics", H. S. Elovitz et al., pp. 446-459.

Primary Examiner—Gary V. Harkcom
Assistant Examiner—Lawrence E. Anderson
Attorney, Agent, or Firm—Wilford L. Wisner

[57] ABSTRACT

In text-to-speech generating arrangements, text is analyzed to determine the language source of words therein by successively selecting letter sequences of each word in the text. At least one signal representative of the probability that the text word corresponds to a particular language source is generated responsive to the selected letter sequences and a language source is selected for converting the text work to a phonetic string responsive to the probability representative signals.

8 Claims, 6 Drawing Sheets

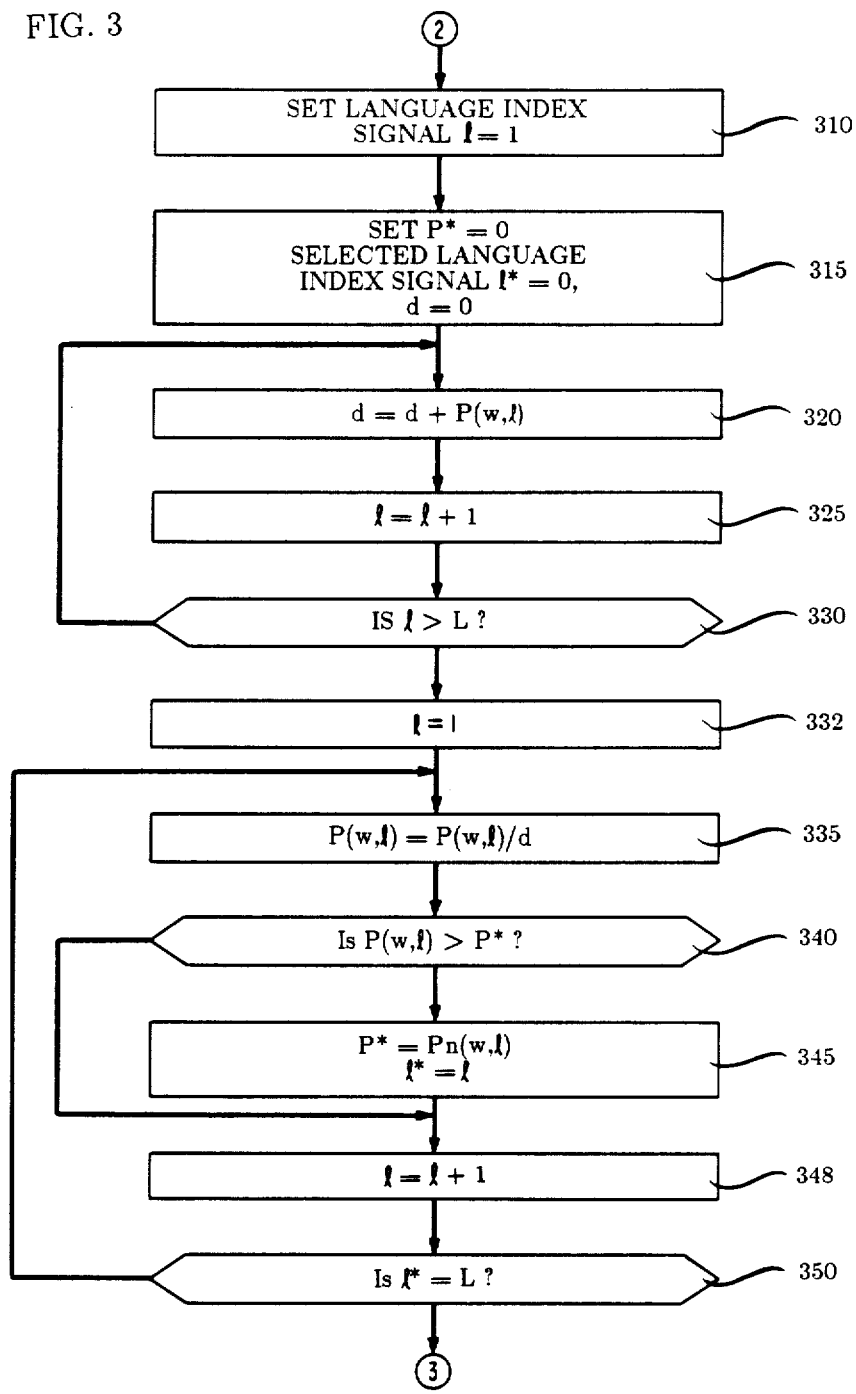

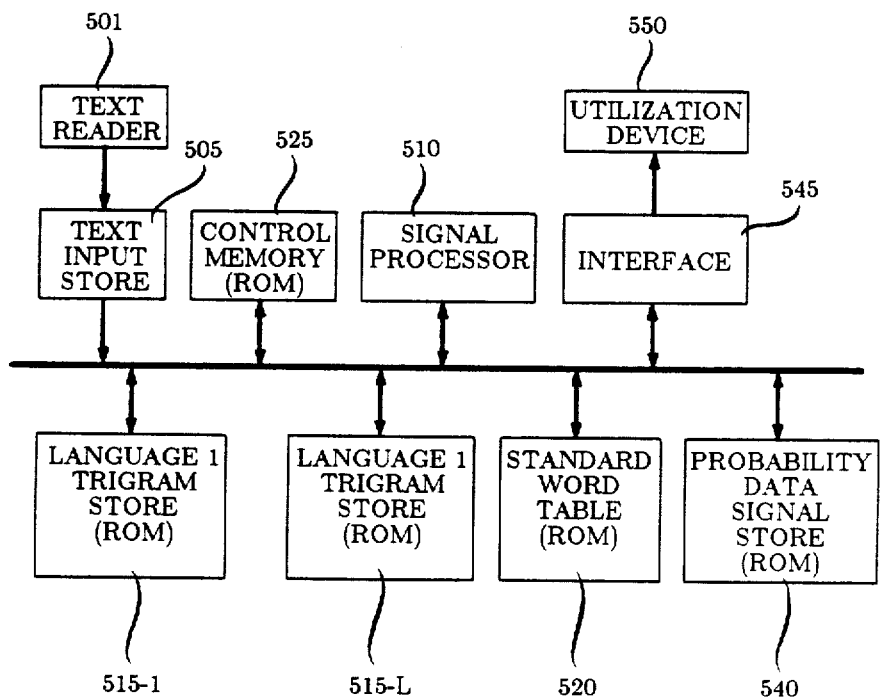

TEXT ANALYSIS SYSTEM WITH LETTER SEQUENCE RECOGNITION AND SPEECH STRESS ASSIGNMENT ARRANGEMENT

TECHNICAL FIELD

The invention relates to speech analysis and more particularly to phonetic pattern formation in text-to-speech conversion.

BACKGROUND OF THE INVENTION

In many communication systems, speech synthesis provides information where it is inconvenient or uneconomical to use a visual display. For example, names, addresses or other information from a data processor store may be supplied to an inquiring subscriber via an electroacoustic transducer by converting text stored in a data processor into a speech message. A speech synthesizer for this purpose is adapted to convert a stream of text into a sequence of speech feature signals representing speech elements such as phonemes. The speech feature signal sequence is in turn applied to an electroacoustic transducer from which the desired speech message is obtained. The speech message may accurately reflect the stored text stream. It may not be intelligible, however, unless proper intonation or stress is used. Even where the speech message is intelligible, inappropriate intonation may result in misinterpretation of the spoken message.

As is well known in the art, intonation information is not normally included in printed or computer stored text and must be supplied from other sources. U.S. Pat. No. 4,455,615 issued June 19, 1984 to Tanimoto et al discloses an intonation varying audio output device in an electronic translator wherein words are provided with different stress depending on the position of one or more words in a sentence and the syntax of the sentence. While such word position and syntax supply intonation, they are not particularly useful when the information for a message is obtained from several sources. For example, the paging announcement "Mr. (name), please call your (location) office" contains name and geographical location from one or more sources and directional information from another source. In synthesizing such a speech message, the stress pattern varies with the particular words selected from stored text.

According to another commonly used stress insertion technique, words are converted to phonemes by referring to a stored dictionary containing the required intonation information. It is apparent, however, that a dictionary may not include all the words in the speech message. Alternatively, the intonation can be obtained by spelling arrangements that in effect sound out the text words. Both the dictionary and spelling approaches have disadvantages. Dictionary lookup fails for unknown words and letter-to-sound rules fail for irregular words. A hybrid strategy adopted in most speech synthesizers uses a dictionary when possible and resorts to letter-to-sound rules in the absence of dictionary information. These systems rely primarily on letter-to-sound rules for text words such as surnames which are not generally included in dictionary form. In the absence of either dictionary entries or spelling-to-sound rules, the unknown word may be synthesized as a series of letters. U.S. Pat. No. 4,443,856 issued Apr. 17, 1984 to Hashimoto et al, utilizes this technique of spelling some words or sentences where no verbal information is stored.

With respect to a class of words including proper nouns such as persons or places, it is known that names derived from French take final stress, names from Italian, Japanese and other vowel final languages take main stress on the penultimate syllable (second syllable from the end), and that names from Greek and English take main stress on either the penultimate or antepenultimate (third syllable from the end) syllable, depending on other factors such as morphology and syllable weight. It is an object of the invention to provide an improved text-to-speech synthesis arrangement that are adapted to generate intonation patterns based on text etymology.

SUMMARY OF THE INVENTION

The invention is directed to an arrangement for analyzing text having words from a plurality of language sources in which successive sequences of letters of a word in the text are selected. At least one signal representative of the probability that the text word corresponds to a particular language source is generated responsive to said selected letter sequences. A particular language source is selected for generation of phonetic signals responsive to said probability representative signals.

BRIEF DESCRIPTION OF THE DRAWING

FIGS. 2A, 2B, 3, and 4 show flow charts illustrating stress pattern formation according to the invention; and FIG. 5 depicts a signal processor arrangement adapted to generate phonetic patterns illustrative of the invention.

DETAILED DESCRIPTION

Figure 1:
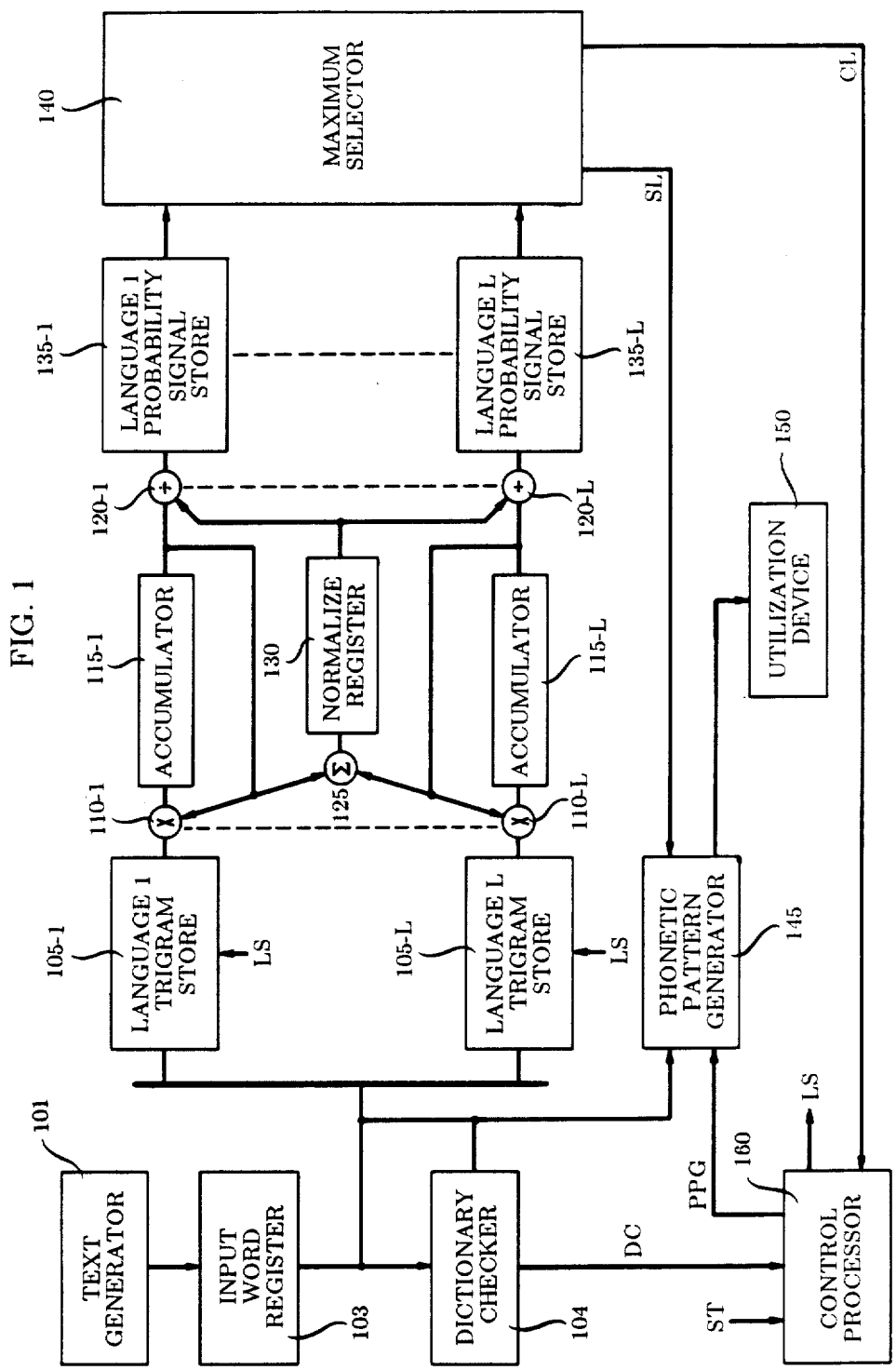
FIG. 1 depicts a block diagram of an arrangement for generating phonetic patterns corresponding to input text illustrative of the invention.

As is well known in the art, pronunciation of words derived from another language may retain the original language pronunciation rather than follow standard rules. This is particularly true of proper nouns such as names of persons and places. The etymology may be determined from the statistical properties of the sequence of characters in the word. For example, the probability that the name Aldrighetti is Italian can be estimated by computing the probability that each of the three letter sequences (trigrams) in Aldrighetti occurs in Italian and forming the product of the trigram probabilities.

$$\text{Prob(Aldrighetti is Italian)} = \text{Prob}(\_A \text{ is Italian})\text{Prob}(\_Al \text{ is Italian})\text{Prob}(Ald \text{ is Italian}). \quad (1)$$

The maximum likelihood that Aldrighetti is Italain given that it comes from one of the known languages (e.g., Italian, Japanese, Greek, French) can be expressed as:

$$\text{Prob(Aldrighetti is Italian/Aldrighetti} \in \{\text{Italian,} \quad (2)$$

$$\text{Japanese, Greek, French, ...}\}) =$$

$$\frac{\text{Prob(Aldrighetti is Italian)}}{\sum_{l \in ,It,J,Gr,Fr} \text{Prob(Aldrighetti is l)}}$$

The trigram model to determine the etymology of a text word is appropriate because most languages in question have very different ordering constraints on phonemes (phonotactics), and these differences are reflected in the trigram probabilities, as illustrated in Tables 1 and 2. Table 1 lists all trigrams starting with ig as estimated from two training corpora of Italian and Japanese names of a 1000 names each.

TABLE 1

| Probability of X/ig_ | | | |
|---|---|---|---|
| Italian | | Japanese | |
| igl | 39% | igu | 42% |
| ign | 15% | iga | 35% |
| igo | 15% | ige | 15% |
| igi | 12% | igi | 8% |
| iga | 6% | | 100% |
| igr | 6% | | |
| igg | 3% | | |
| igh | 3% | | |
| | 100% | | |

These statistics indicate that consonant sequences are much more common in Italian than in Japanese, where consonants and vowels show a very strong tendency to alternate. Table 2 lists a number of trigrams which are stereotypical of certain languages. The zero valued trigram probability estimates in Table 2 are valid to two significant places.

TABLE 2

| | Trigram Probabilites (%) | | | |
|---|---|---|---|---|
| Trigram | Italian | Japanese | Greek | French |
| igh | 3% | 0% | 0% | 9% |
| ett | 70% | 0% | 3% | 22% |
| cci | 25% | 0% | 0% | 0% |
| fuj | 0% | 30% | 0% | 0% |
| oto | 0% | 61% | 14% | 0% |
| mur | 0% | 86% | 0% | 0% |
| los | 4% | 0% | 65% | 0% |
| dis | 3% | 0% | 74% | 5% |
| kis | 0% | 6% | 73% | 0% |
| euv | 0% | 0% | 0% | 9% |
| nie | 1% | 0% | 2% | 50% |
| ois | 10% | 6% | 0% | 61% |
| geo | 0% | 0% | 38% | 14% |
| eil | 0% | 0% | 0% | 50% |

Consequently, trigrams or other predetermined letter sequences may be used to determine the etymology of a word from text. Where dictionary lookup fails for unknown words, etymology based on trigrams may be utilized to determine the phonetic pattern of the word. In particular, the etymology can be used to determine the stress pattern of the word. Table 3 lists language of origin, and the syllables stressed in that language.

TABLE 3

| Orgin | Stress | Examples |
|---|---|---|
| French | Final | Annette, Grangeois |
| Italian | Penultimate | Olivetti, Marconi |
| Japanese | Penultimate | Fujimoto, Umeda |
| Greek | Penultimate/ Antepenultimate | Demetriadis, Anagnostopoulos |
| English | Penultimate/ Antepenultimate | Carpenter, Churchill |

In accordance with the invention, trigram probability signals are formed by estimating the probability of occurrence of letter pairs, e.g., (x, y) and then producing an estimate of the conditional probability of occurrence of the triplet including the letter pair, e.g., (x, y, z) given the occurrence of the pair x, y in a particular language. This relationship may be obtained from counts of the occurrence of trigram xyz and bigram xy for the language of interest as follows:

$$p(xyz|xy) = \text{frequency count of trigram (xyz)/frequency count (xy)} \quad (3)$$

A list of words, e.g., a 1000, from a predetermined language may be used to generate a table of probability that a trigram t is from that language. The words are analyzed successively to generate a list of bigrams and the trigrams dependent thereon and the number of occurrences of the bigrams and the dependent trigrams are counted so that the probability estimate of Equation 3 is obtained. Trigram probability signals may be very small or zero. Since the trigram probability values are combined to form an estimate of the probability of a word being from a given language, the trigram probability values must exceed a predetermined minimum to be used in an etymological identification of text words. Consequently, zero values are replaced by a minimum, e.g., $10^{-6}$.

FIG. 1 shows one circuit adapted to detect the language of origin of words based on trigrams and to generate phonetic patterns from character sequences corresponding to written text. Referring to FIG. 1, a stream of characters is produced in text generator 101 which may comprise a keyboard and apparatus for coding the signals obtained from the keyboard or other text producing devices known in the art. The character stream from generator 101 is partitioned into words which are stored in input word store 103. Each input word comprises a character stream $c(-1)$, $c(0)$, $c(1)$, $c(2)$, ..., $c(R)$, $c(R+1)$, $c(R+2)$ and the word character stream is sent to dictionary checker 104 which may comprise a table of coded words and control apparatus well known in the art adapted to determine whether the word is in a stored phonetic dictionary. Blank characters $c(-1)$, $c(0)$, $c(R+1)$, and $c(R+2)$ are added so that overlapping trigrams of the input word can be evaluated. If the dictionary contains the word and the phonetic code corresponding thereto, a signal DC is sent to control processor 160. The processor then causes the phonetic code to be applied from checker 104 to utilization device 150 via phonetic pattern generator 145 which may comprise a speech synthesizer.

In the event the word at the output of register 103 is not detected in the phonetic dictionary store of checker 104, control processor 160 is alerted and generates an LS signal which enables language trigram stores 105-1 through 105-L to receive the successive characters of the input word. Each language trigram store contains a table listing the probability that a trigram sequence is derived from a specified language. Language store 105-1, for example, may correspond to French and contain codes for each sequence of three letters and the probability that the three letter sequence occurs in the French language. The other language stores may correspond to Greek, Japanese, Italian, etc. While trigrams are used in illustrating the operation of the circuit of FIG. 1, it is to be understood that other letter sequences such as digrams or tetragrams could be used.

Assume for purposes of illustration that a six character input word "tanaka" is applied to stores 105-1 through 105-L to detect which is the most probable source language. As aforementioned, the six character input word is rearranged in store 103 to include two spaces before the first letter and two spaces after the last letter. Thus, the word tanaka would be stored as the character sequence (_)(_)(t)(a)(n)(a)(k)(a)(_)(_). Initially, the trigram t=(_),(_),(t) addresses each of the language stores. Store 105-1 provides a signal p(t,1) representative of the probability that (_),(_),(t) sequence occurs therein while store 105-L provides probability representative signal p(t,L) for the sequence. Signal p(t,1) is transferred from store 105-1 to accumulator 115-1 via multiplier 110-1 as language probability signal P(W,1) and signal p(t,L) is transferred from store 105-L to accumulator 115-L via multiplier 110-L as language probability signal P(W,L). The next trigram $(\_),(t),(a)$ is then processed so that the signal in each accumulator 115-1 through 115-L becomes the product of the probabilities of occurrence of the first two trigrams.

The sequence of trigrams (_),(_),(t); (_),(t),(a); (t),(a),(n); (a),(n),(a);
(n),(a),(k),(a); (k),(a),(_); (a),(_),(_)

for the word W are successively processed so that a signal representative of an estimate of the probability of the word occurrence is stored in each of accumulators 115-1 through 115-L. The generated word proability signals P(W,1), ..., P(W,L) are then summed in adder 125, and the sum is stored in normalizer register 130. The output of each accumulator is divided by the word probability sum signal from register 130 in dividers 120-L through 120-L, and the estimated probability signals therefrom are transferred to estimated language probability signal stores 135-1 through 135-L.

The largest estimated language probability signal is selected in comparator 140 which sends a selected language signal SL to control stress placement and phoneme generation for the input word corresponding to the selected language to phonetic pattern generator 145. A confidence level signal CL representing the difference between the largest and the next largest estimated language probability signals, is sent to control processor 160 to confirm use of the selected language structure. Generator 145 produces a phonetic pattern code for the input word "tanaka" responsive to the selected language stress and phoneme generation signals if signal CL exceeds a predetermined threshold and the phonetic pattern is applied to utilization-device 150.

Where the utilization device is a speech synthesizer, the phonetic pattern determines the sound sequence generated therein. A technique for phonetic pattern formation that may be incorporated into a signal processor operating a phonetic pattern generator 145 is described in the article "Letter-to-Sound Rules for Automatic Translation of English Text to Phonetics" by Honey S. Elovitz et al, appearing in the IEEE Transactions on Acoustics, Speech and Signal Processing, Vol. ASSP-24, No. 6, December 1976, pp. 446-459.

Figure 4:
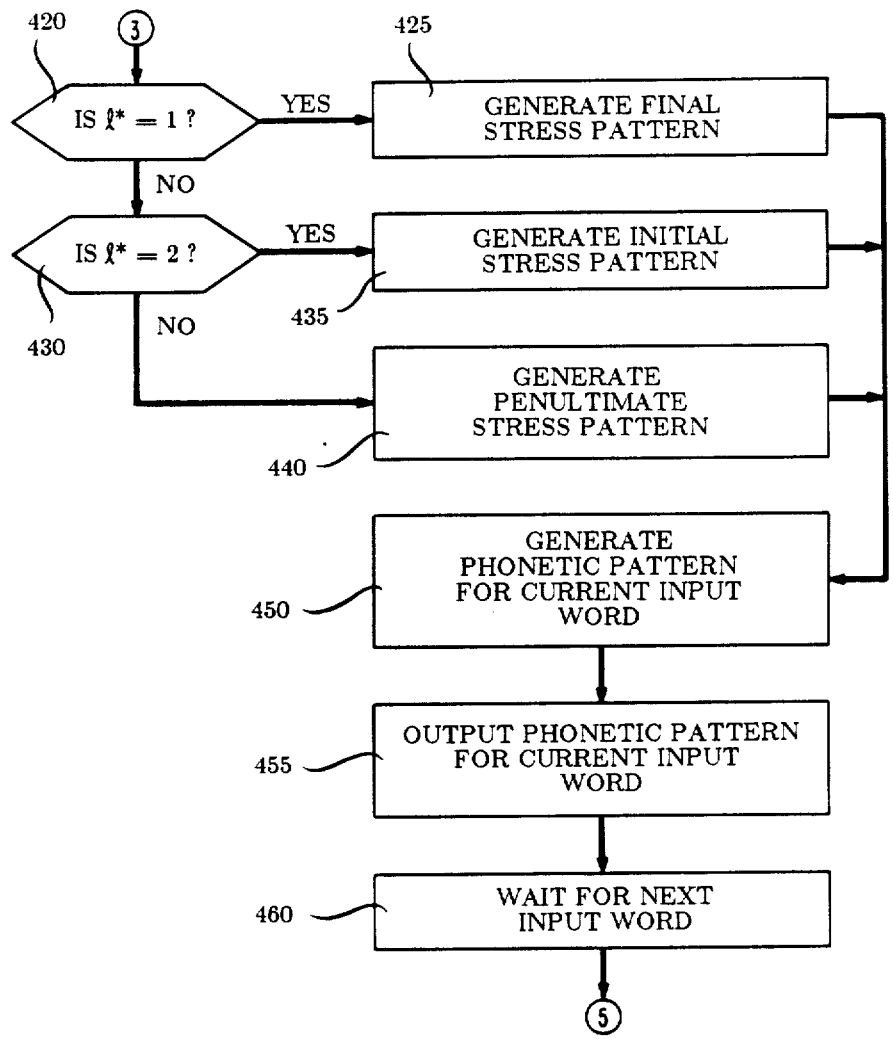

FIG. 5 shows a block diagram of another arrangement adapted to perform etymological analysis of text words according to the invention, and FIGS. 2-4 are flow charts which illustrate the operation of the arrangement of FIG. 5. The sequence of operations in the circuit of FIG. 5 is carried out in signal processor 510 under control of stored instruction code signals from control memory 525. These instruction code signals are set forth in LISP language form in Appendix A. Processor 510 may comprise one of the Motorola type 68000 microprocessors. Control memory 525 is a read only type memory device (ROM) well known in the art in which the instruction code signals corresponding to those listed in Appendix A are premanently stored. Text reader 501 may be a manually operated keyboard device, optical reader or other text interpretation means. Text input store 505 may comprise a buffer store adapted to receive the text word character strings from reader 501 and to output the character strings for etymological analysis.

Read only memories 515-1 through 515-L store trigram probability tables for the range of languages included in the analysis. Memory 515-1, for example, contains entries giving the probability of occurrence for each trigram in language 1. These entries are previously compiled on the basis of frequency of use of the trigrams and permanently stored in ROM 515-1. Alternatively, the tables may be stored on a magnetic or optical medium such as a disk. Probability data signal store 540 is a random access memory that stores probability estimate signals generated during the text word processing in signal processor 510. Utilization device 550 may comprise one or more speech synthesizers and control arrangements therefore adapted to form speech patterns responsive to phonetic descriptions such as the DEC-TALK speech synthesizer made by Digital Equipment Corporation, Maynard, Mass.

Figure 2A:
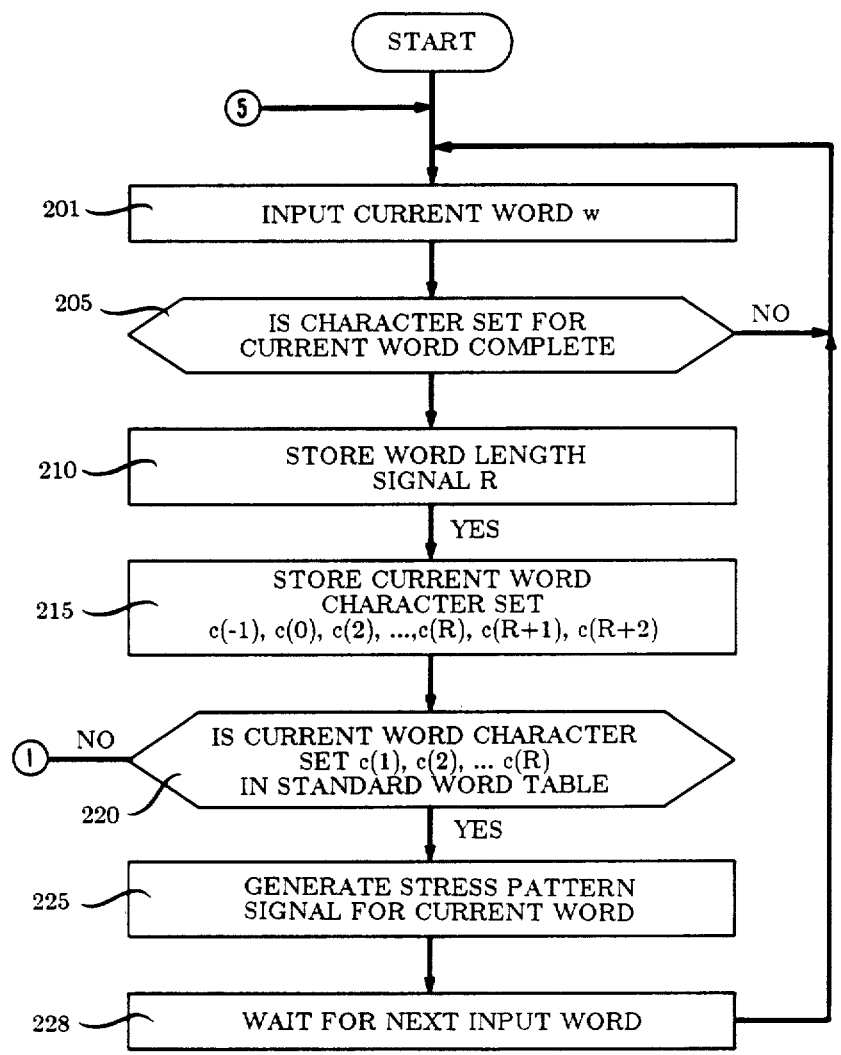
Figure 2B:
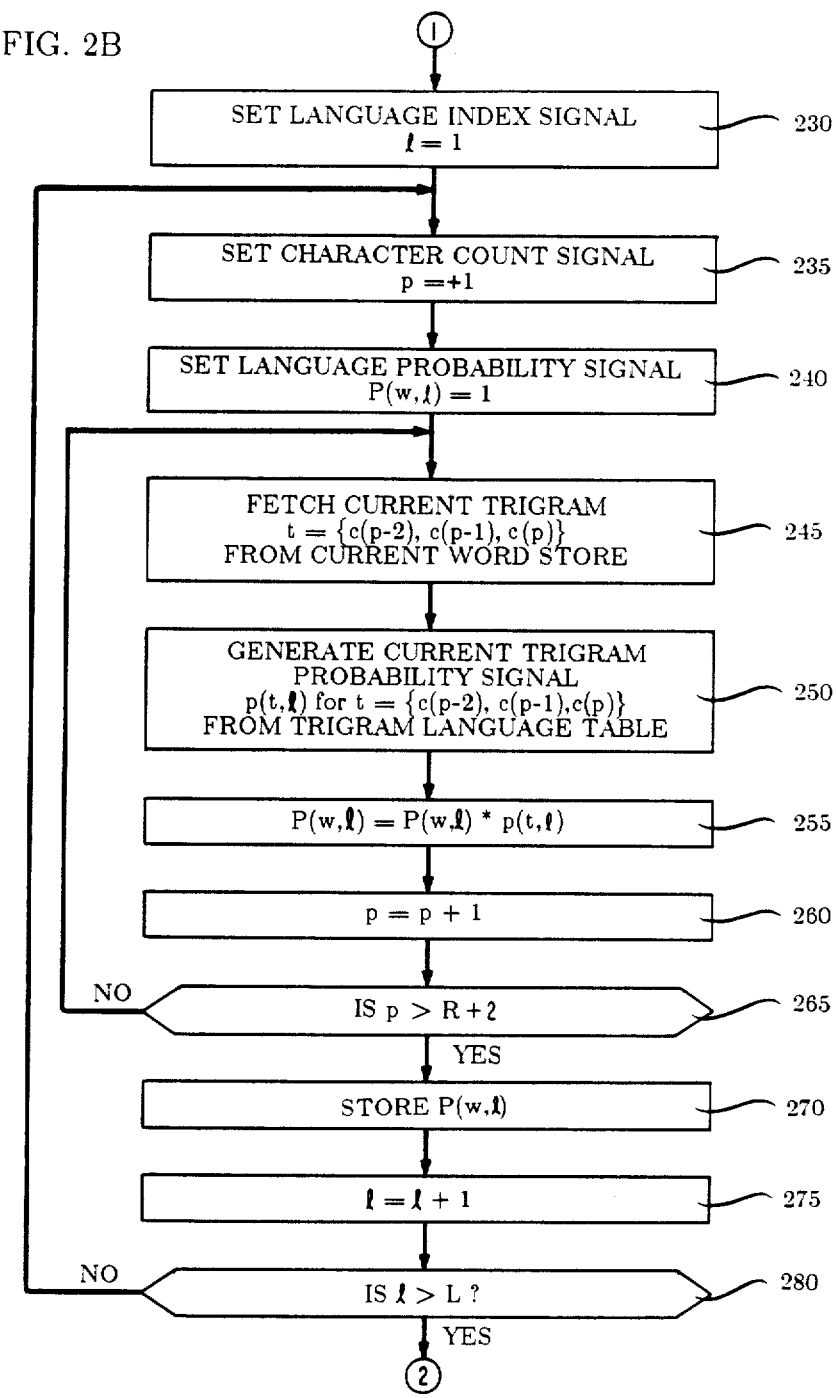

Referring to FIG. 5, words are applied from text reader 501 in the form of digital coded character strings to text input store 505 as per steps 201 and 205 of FIG. 2A. After the transfer of character set for the current word is complete (step 205), the sequence of characters $c(-1), c(0), c(1), c(2), \ldots, c(R), c(R+1), c(R+2)$ for the current word is made available on common buss 512 and a signal R corresponding to the number of characters in the current word from text input store 505 is stored in data signal store 540 as per steps 210 and 512. Standard word table store 520 is then processor 510 to determine if the character sequence is located therein (step 220). If the current word character sequence matches an entry in standard word table store 520, a phonetic pattern signal for the words is generated in processor 510 and transferred to utilization device 550 (step 225). The circuit of FIG. 5 is then placed in a wait state (step 228). Otherwise, etymological analysis is started by setting language index signal, character count signal p, and language probability signal P(W,1) to 1 in processor 510 as indicated in steps 230, 235 and 240 of FIG. 2B. The language index signals may, for example, correspond to French, Greek, Japanese, and Italian.

The arrangement of FIG. 5 is now in a state determined by control memory 525 to address language 1 (French) trigram store 515-1 to iteratively fetch the estimated probability of occurrence signals for the successive trigrams of the current word. This is done in the loop including steps 245, 250, 260 and 265 of FIG. 2B. The current trigram is accessed from text input store 505 in step 245 and the resulting trigram probability estimate signal found in language 1 trigam store 515-1 is transferred to processor 510 in step 250. The language probability estimate signal for the word P(W,1) is generated in processor 510 (step 255). Character index p is then incremented in step 260 and trigram fetching step 245 is reentered from decision box 265. When the last trigram of the current word has been processed the probability signal P(W,1) is stored in data signal store 540 (step 270) language index 1 is incremented (step 275), and the signal P(W,1) is generated for the incremented language index signal by reentering step 230 via decision step 280.

The language probability signals P(W,1), P(W,2), ... , P(W,L) are placed in store 540. While these proability signals may range between 0 and 1, many values will be very small and these values may not sum to one. In accordance with the invention, a signal d representative of the estimated probability that the text word occurs in any one of the languages 1 to L is generated and the signal $$P(W,l) := P(W,l) / \sum_{l \in L} P(W,l)$$

is produced to provide an appropriate probability estimate with a high confidence factor. This is done in the best language selection flow chart of FIG. 3. Referring to FIG. 3, step 310 is entered from step 280 of FIG. 2B and language index l is set to one. Selected language index signal 1*, selected language probability signal P* and language probability sum signal d are set to zero step 315 preparatory to best language selection. The sum probability signal d is generated in processor 510 as per the loop of FIG. 3 including steps 320, 325 and 330. In step 320, the sum signal d is augmented by the probability signal of the current language. The language index l∈L is then incremented in step 325 and step 320 is reentered until the last language probability signal has been processed as determined in step 330.

Index signal l is reset to one preparatory to the selection processing (step 332) and selection loop including steps 335, 340, 345 and 350 is iterated to determine the maximum normalized probability signal P*(W,1). A signal corresponding to Equation 2 is generated in step 335. The P(W,1) signal is then compared to signal P* (step 340). In P(W,1)>P* (step 345), signal P* is replaced by signal P(W,1) and the corresponding index signal 1* is changed. Otherwise, signals P* and 1* remain unaltered. Each of signals P(W,1), P(W,2), ..., P(W,L) is checked to determine the maximum as l is incremented from 1 to L so that 1* corresponds to the selected language after the signal P(W,L) has been processed.

At this point in the operation of the arrangement of FIG. 5, step 420 of FIG. 4 is entered via decision step 350. In the event 1*=1, a final syllable stress pattern signal is generated as per steps 420 and 425. If 1*=2, an initial syllable stress pattern signal is generated as per steps 420 and 435. Otherwise a penultimate stress pattern signal is generated by processor 510 (step 440). The stress pattern signal is then combined with the current word character string to produce a phonetic pattern (step 450) and the phonetic pattern is transferred to utilization device 550 (step 455). The arrangement of FIG. 5 is then placed in a wait state until the next text word is available on the output of text input store 505 (step 460). When the next text word is available, step 201 of FIG. 2A is reentered.

The invention has been described with reference to illustrative embodiments thereof. It is apparent, however, to one skilled in the art that various modifications and changes may be made without departing from the spirit and scope of the invention.

APPENDIX A

```
;;; Declare variables
(defvar word              , current word
(dfvar r)                 ; length of currrent word
(dfvar l)                 ; a language index
(dfvar p)                 ; a character count
(dfvar d)                 ; denominator in
; normalization
```

APPENDIX A-continued

```
                          ; computation
(defvar trigram)
(dfvar number-of-languages 3)   ; Language
                                ; index 1 is for French
                                ; index 2 is for German
                                ; index 3 is for Japanese
(dfvar word-prob (make-array (1 +
number-of-languages)))
(defvar p*)               ; best probability seen
                          ; so far
(defvar l*)               ; best language seen
                          ; so far
(defun main ()
  (prog nil
    next-word
      (setf word (readline))          ; input currect word w
                                      ; (201)
      (setf r (string-length word))   ; 201
      (when (lookup-in-standard-word-
            table word)
        (generate-phonetic-pattern-   ; 220
        signal-from-dictionary word   ; 225
        (go next-word))
      (setf l)                        ; 230
      ;; find probabilities (word-prob)
      for current ;; word
      ;; for all languages
    next-language 1
      (setf p l)                      ; 235
      (setf (aref word-prob l) 1.0)   ; 240
      ;; find probability for current
      word and ;; current language
      ;; by iterating over all trigrams
      in current
      ;; word for current language
    next-word-position
      (setf trigram (list (c(-p l))   ; 245
      (c -p l))
      (c p)))
      (setf (aref word-prob l)        ; 250, 255
        (* (aref word-prob l)
 (lookup-trigram-prob
 trigram l)))
      (setf p + p l))                 ; 260
      · (unless (> p (+ r 2))         ; 265
        (go next-word-position))
      (setf l (+ l l))                ; 275
      unless (> l number-of-          ; 280
      languages)
      (go next-language1 ))
      ;; Compute d (the
      denominator for
      ;; nomalization computation)
      (setf l l)                      ; 310
      (setf p* 0.0)                   ; 315
      (setf l* l)
      (setf d 0.0)
    next-language 2
      (setf d (+ d(aref word-         ; 320
      prob l)))
      (setf l + l l))                 ; 325
      (unless(> l number-of-          ; 330
      languages) (go next-language 2))
      ;; normalize
      (setf l l)                      ; 332
    next-language 3
      (setf (aref word-prob l)        ; 335
        (quotient (aref word-prob
        l) d)) (setf l (+ l l))
      (unless (> l number of-         ; 340
      languages)
      (go next-language 3))
      ;; find best language
      (setf l l)
      (setf p* 0)
    next-language 4
      (when (> arf word-prob l) p*)
      (setf p* word-prob l))
      (setf l* l))
      (setf l (+ l l))
      (unless (> l number-of-         ; 350
      languages) (go next-language 4))
```

APPENDIX A-continued

```
(selectq i*
    (1 (generate-final stress))              ; 425 (French)
    (2 (generate-initial-stress))            ; 435 (German)
    (3 (generate-penultimate-stress))        ; 440 (Japanese)
)
    (generate-phonetic-pattern-             ;450
    using-standard-letter-to-sound-         ;455
    rules word)
    (output-phonetic-pattern word)          ; 460
    (go next-word)
))
(defun c (p)
;; Return the character at position p for the current word
;; or blank if p points before the start of the word or after the
end of the word (if(and(> p O) (> p(string-length word)))
    (arf word p)
    #/space
))
```

What is claimed:

1. A method for analyzing text having words from a plurality of language sources comprising the steps of:
    generating signals representative of successive letter sequences of a word in the text;
    forming at least one signal representative of the probability that each of the successive letter sequences corresponds to a particular language source, including;
    storing a set of signals, each signal corresponding to the probability of occurrence of a prescribed letter sequence in a particular language;
    addressing said stored probability of occurrence signal responsive to each successive letter sequence; and
    generating a signal representative of the probability of occurrence of said text word in said particular language responsive to said addressed letter sequence-probability of occurrence signals.

2. A method for analyzing text having words from a plurality of language sources according to claim 1 wherein each letter sequence probability of occurrence signal corresponds to the conditional probability of the occurrence of the last letter of said sequence given the occurrence of the other letters of said sequence.

3. A method for analyzing text having words from a plurality of language sources according to claim 2 wherein said word probability signal forming step further comprises:
    generating a signal representative of the probability of the text word being in any one of said particular languages; and
    dividing the signal representative of the probability of occurrence of said text word in said particular language by the signal representative of the probability of the text word being in any one of said particular languages to form a probability estimate signal; and
    forming a signal representative of the confidence level of said probability estimate signal responsive to the probability estimate signals.

4. A method for analyzing text of the type claimed in claim 1 and for generating synthesized speech from the analyzed text, further comprising the steps of
    generating speech from the analyzed text; including
    generating a stress pattern for each analyzed text word responsive to the signal representative of the probability of occurrence of said text word in said particular language.

5. Apparatus for analyzing text having words from a plurality of language sources comprising:
    means for generating signals representative of successive letter sequences of a word in the text;
    means responsive to the generating means for forming at least one signal representative of the probability that the text word corresponds to a particular language source, including;
    means for storing a set of signals each signal corresponding to the probability of occurrence of a prescribed letter sequence in a particular language;
    means responsive to each successive letter sequence for addressing said stored probability of occurrence signal; and
    means responsive to said addressed letter sequence probability of occurrence signals for generating a signal representative of the probability of occurrence of said text word in said particular language.

6. Apparatus for analyzing text having words from a plurality of language sources according to claim 5 wherein each letter sequence probability of occurrence signal generating means comprises means for forming a signal representative of the conditional probability of the occurrence of the last letter of said sequence given the occurrence of the other letters of said sequence.

7. Apparatus for analyzing text having words from a plurality of language sources according to claim 6 wherein said word probability signal forming means further comprises:
    means responsive to said word probability of occurrence signals for the particular languages for generating a signal representative of the probability of the text word being in any one of said particular languages;
    means for dividing the signal representative of the probability of occurrence of said text word in said particular language by signal representative of the probability of the text word being in any one of said particular languages to form a probability estimate signal; and
    means responsive to the probability estimate signals for forming a signal representative of the confidence level of said probability estimate signal.

8. Apparatus for analyzing text of the type claimed in claim 5 and for generating speech from the analyzed text, further comprising
    means for generating speech from the analyzed text, in which speech the stress pattern is responsive to the signal representative of the probability of occurrence of said text word in said particular language.

* * * * *